Jan. 1, 1957     H. WALTER     2,776,087

GAS COMPRESSOR SYSTEM

Filed Jan. 26, 1956

HELLMUTH WALTER
*INVENTOR.*

BY Daniel A. Bobis
 *Atty*

United States Patent Office 2,776,087
Patented Jan. 1, 1957

2,776,087
GAS COMPRESSOR SYSTEM

Hellmuth Walter, Upper Montclair, N. J., assignor to Worthington Corporation, Harrison, N. J., a corporation of Delaware Application January 26, 1956, Serial No. 561,590

7 Claims. (Cl. 230—116)

The present invention relates to a natural gas supply system and more particlarly to a gas compressor station in the system.

In a natural gas supply system it is necessary to pipe the gas over long distances from the fields where it is obtained to the point of use, for example, to industries and houses in towns and cities far from the natural gas field. At intervals along the gas pipe line compressor stations are provided for increasing the pressure of the gas in order to pump it to the point of use. The compressors in these stations are usually driven by gas engines supplied with gas for combustion from the natural gas pipe line itself.

In the present invention, a gas compressor station is provided having a gas engine compressor and a gas turbine compressor combined therein to form a composite gas compressor system for increasing the pressure in the gas pipe line for delivery to the point of use, which system provides flexible control means for maintaining the pressure desired over a wide load range.

The present invention further provides a gas engine compressor cycle for a gas pipe line having a gas turbine compressor cycle incorporated therein for increasing the power of the gas compressor station to provide a wide load range therefor.

The present invention also provides a gas engine compressor station for a pipe line to maintain the desired gas pressure in the pipe line at low load range, and a gas turbine compressor cycle in communication therewith for boosting the power of the station when the load demand thereon increases above normal demand.

The present invention still further provides a gas compressor station having a gas turbine compressor for a pipe line having a gas engine compressor in communication therewith for increasing the power thereof and providing a wide load range for the station.

The invention will be better understood from the following description when considered in connection with the accompanying drawing forming a part thereof and in which.

Figure 1:
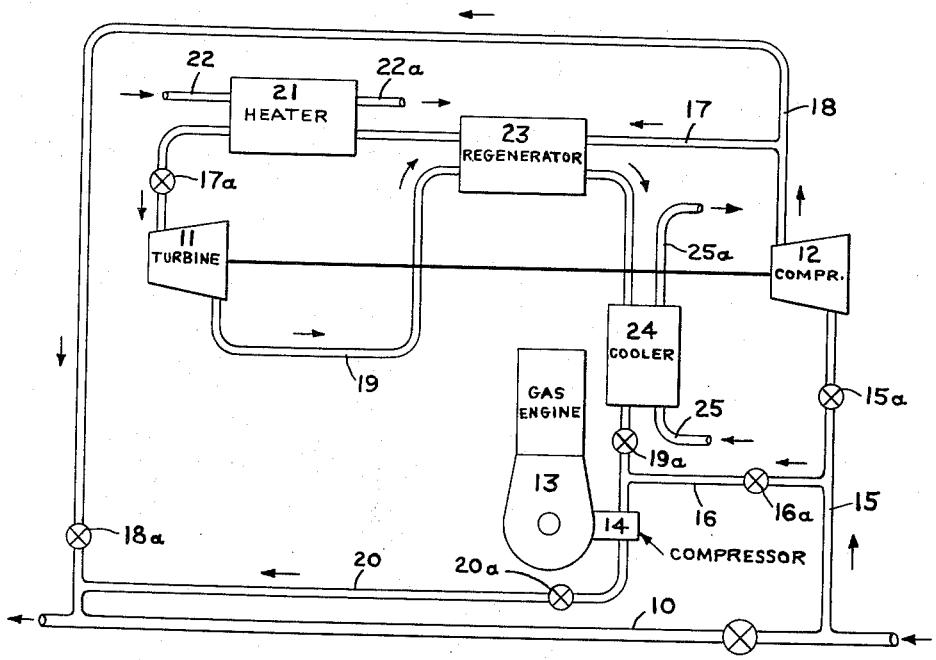
Figure 1 is a diagrammatic diagram of one embodiment of the invention.

Referring to Figure 1, the reference numeral 10 designates a gas pipe line in communication at one end thereof with a natural gas field, not shown, and at the other end thereof with a point of use, not shown. A gas turbine 11 connected to drive a compressor 12 and a gas engine 13 connected to drive a compressor 14, are provided for increasing the pressure of the gas in line 10. A conduit 15 connected at one end to line 10 and at the other end to compressor 12, and a conduit 16 connected at one end to conduit 15 and at the other end to compressor 14 supplies gas to be compressed to the respective compressors. Valves 15a and 16a are disposed in conduits 15 and 16 respectively to control the flow of gas therethrough. Fuel gas to operate engine 13 may be supplied by means, not shown, from gas line 10 if desired. Fuel gas to drive turbine 11 is supplied thereto by conduit 17 having one end thereof in communcation with the turbine and the other end thereof in communication with the discharge conduit 18 of compressor 12. A throttle valve 17a is disposed in conduit 17. The compressed gas flowing through conduit 18 is returned to pipe line 10 through the discharge end of conduit 18 connected to line 10 downstream of conduit 15. A control or shut-off valve 18a is disposed in conduit 18. A turbine discharge conduit 19 is connected at one end to the turbine and at the other end to compressor 14 to pass gas which has been expanded in turbine 11 to compressor 14 for recompression therein. A discharge conduit 20 having a control valve 20a therein is connected to compressor 14 and conduit 18 to pass gas recompressed in compressor 14 back to line 10 through conduit 18.

A heat exchanger 21 is disposed in inlet conduit 17 having heated fluid inlet and outlet lines 22 and 22a, respectively, in communication therewith for supplying heat from a source, not shown, to pass in indirect heat exchange relationship with fuel gas flowing to the turbine to supply energy to the gases for driving the turbine 11. A regenerator 23 is provided in conduits 17 and 19 for passing the exhaust gases from turbine 11 in heat exchange relationship with the fuel gas passing through conduit 17 to heat exchanger 21 to preheat the gases before they are introduced into the heater to utilize the waste heat in the turbine exhaust gases. A cooler 24 having cooling fluid inlet and outlet lines 25 and 25a, respectively, in communication therewith is disposed in conduit 19 between regenerator 23 and compressor 14 for cooling the exhaust gases before they are introduced into compressor 14.

In operation, natural gas flowing through line 10 from a natural gas field, not shown, passes therefrom through conduit 15. Thereafter, a portion of the gas flows through compressor 12 wherein it is compressed, and another portion flows through conduits 16 and 19 into compressor 14 wherein it is compressed to the pressure desired and is discharged from compressor 14 through conduits 20 and 18 and is returned to pipe line 10.

The portion of gas compressed in compressor 12 is discharged therefrom through conduit 18 and a portion thereof returned to line 10, while another portion is separated therefrom and flows through conduit 17 to turbine 11 to drive the turbine connected to compressor 12. Before entering turbine 11 the gas is heated in regenerator 23 extracting waste heat from the exhaust gases leaving the turbine through discharge conduit 19. Thereafter, the gases pass into heat exchanger 21 where they flow in heat exchange relationship with heated fluid passing through the exchanger in conduit 22 in communication with a source of external heat, not shown. Thereafter, the gases flow into turbine 11 and after expansion therein, to drive the turbine and compressor 12 connected thereto are discharged therefrom through conduit 19. The gases then flow through regenerator 23 to cooler 24 wherein heat is extracted from them through a cooling fluid passed through the cooler through conduit 25. Thereafter, the gases join the portion of gases flowing through conduit 16 and enter compressor 14 wherein they are recompressed to the pressure desired, the compressor being driven by gas engine 13.

When the load demand at the point of use decreases, valve 15a in conduit 15 is closed. Valve 19a in conduit 19, and valve 18a in conduit 18 are also closed, and valve 16a is maintained in an opened position so that all of the gas from line 10 flows through conduits 15 and 16 to compressor 14 wherein the pressure is increased to that desired and the gas turbine compressor cycle is completely by-passed.

Thus, the gas compressor station of the present invention may handle a wide load range.

In addition, the present invention provides flexible control of the load range for the gas compressor station by operating turbine 11 and gas engine 13 at various speeds to compress the gas pressure in line 10 to the desired value for the load demand required. This is accomplished by maintaining valve 16a in a fully opened position and partially closing valve 17a to throttle the volume of gas delivered to the turbine inlet, by reducing or increasing the speed of the gas engine, by means not shown, and by reducing or increasing the turbine inlet temperature by regulating the flow of heated fluid through the heat exchanger 21. Thus, the present invention provides flexible control means for a gas compressor station to meet the required load demand thereon.

Figure 2:
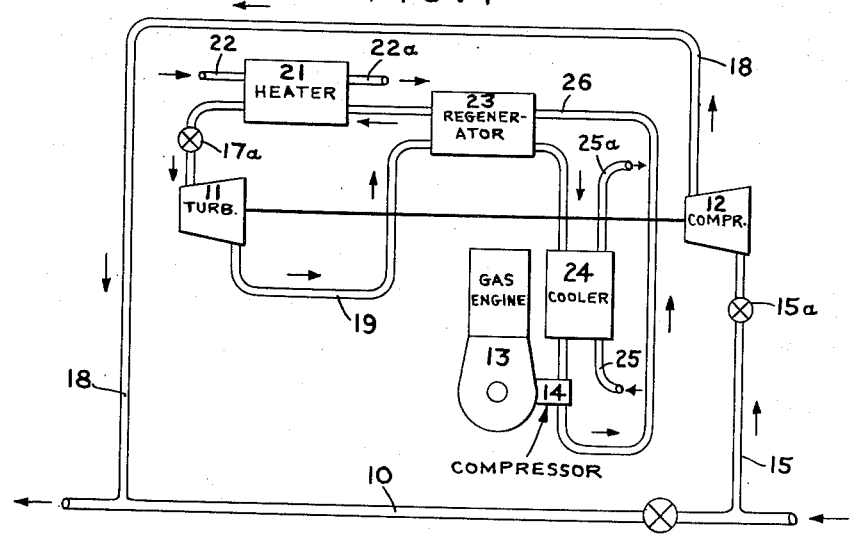
Figure 2 is a digrammatic drawing of a modified form of the invention.

The embodiment of the invention shown in Figure 2 is substantially the same as illustrated in Figure 1, except that the turbine cycle is a closed cycle and gas engine compressor 14 is the compressor for the gas turbine 11 under all load conditions. Gas turbine inlet conduit 26 is connected to the discharge side of gas engine compressor 14, instead of the discharge conduit 18 of gas turbine compressor 12 as in Figure 1. There is no cross connection conduit 16 connecting gas supply conduit 15 with the inlet or suction of gas engine compressor 14, and compressor 14 has no discharge conduit 20 as in Figure 1, in communication with discharge conduit 18 which returns gas compressed in compressor 14 to pipe line 10.

The operation is substantially the same as the embodiment of the invention in Figure 1 except that gas is supplied to the closed turbine cycle inlet conduit 26 by means not shown, is expanded in turbine 11 to drive compressor 12 and is discharged therefrom through discharge conduit 19 to compressor 14. Thereafter, the compressed gas is again recycled to the turbine as the motive fluid therefor through inlet conduit 26. Thus, the turbine driven compressor 12 is the pipe line compressor under all conditions in this embodiment of the invention.

Provision of a closed cycle for the gas turbine 11 driving compressor 12 enables the turbine to be operated independently of the pressure in the gas line 10 as the turbine does not receive its supply of gaseous fuel therefrom and hence is completely unaffected by the pressure therein. If desired, the closed cycle turbine may also be actuated by a motive fluid other than natural gas. When natural gas is used to actuate the turbine, sufficient heat may be supplied to heater 21 to burn off or separate unstable gases from the gases being continuously recycled through the turbine. These separated gases are discharged from the cycle by leakage.

It will be understood that changes may be made in the form, location and materials used in the construction of and arrangement of the various parts of the apparatus disclosed herein without departing from the principles of the invention which is not to be limited except by the scope of the invented claims.

What is claimed is:

1. Apparatus for a gas compressor station for increasing the pressure of gas flowing through a pipe line comprising a first gas compressor, a turbine connected to said first compressor for driving it, a supply conduit connected to said first compressor and pipe line for passing gas therethrough to the compressor, a discharge conduit connected to said first compressor and said pipe line downstream of said supply conduit for passing gas discharged from said first compressor therethrough back to said pipe line, a turbine inlet conduit connected to said discharge conduit and turbine for supplying gas thereto for driving the turbine, a heat exchanger disposed in said turbine inlet conduit, a heated fluid conduit in communication with said exchanger for passing fluid therethrough in heat exchange relationship with gas flowing therethrough to the turbine, a second compressor, a gas engine connected to said compressor for driving it, an outlet conduit connected to the turbine and said second compressor for passing gas discharged from the turbine therethrough to the second compressor, a regenerator, said regenerator being in communication with said turbine inlet and outlet conduits for passing gas flowing to the turbine in heat exchange relationship therein with gas discharged from said turbine, a cooler disposed in said turbine outlet conduit between said regenerator and said second compressor, a cooling fluid conduit in communication with said cooler for passing cooling fluid therethrough in heat exchange relationship with gas flowing therethrough to said second compressor, a compressor outlet conduit connected to said second compressor for flowing gas therethrough from said second compressor, and control means for controlling the flow of gas to said first compressor.

2. The apparatus of claim 1 wherein the compressor outlet conduit connected to said second compressor is connected at the opposite end thereof to said turbine inlet conduit.

3. The apparatus of claim 1 wherein the compressor outlet conduit connected to said second compressor is in communication with said pipe line.

4. Apparatus for a gas compressor station for increasing the pressure of gas flowing through a pipe line comprising a first gas compressor, a turbine connected to said first compressor for driving it, a supply conduit connected to said first compressor and pipe line for passing gas therethrough to the compressor, a discharge conduit connected to said first compressor and said pipe line downstream of said supply conduit for passing gas discharged from said first compressor therethrough back to said pipe line, a turbine inlet conduit connected to said discharge conduit and turbine for supplying gas thereto for driving the turbine, a heat exchanger disposed in said turbine inlet conduit, a heated fluid conduit in communication with said exchanger for passing heated fluid therethrough in heat exchange relationship with gas flowing therethrough to the turbine, a second compressor, a gas engine connected to said second compressor for driving it, an outlet conduit connected to the turbine and said second compressor for passing gas discharged from the turbine therethrough to the second compressor, a regenerator, said regenerator being in communication with said turbine inlet and outlet conduits for passing gas flowing to the turbine in heat exchange relationship therein with gas discharged from said turbine, a cooler disposed in said turbine outlet conduit between said regenerator and said second compressor, a cooling fluid conduit in communication with said cooler for passing cooling fluid therethrough in heat exchange relationship with gas flowing therethrough to said second compressor, a compressor outlet conduit connected to said second compressor and in communication with said pipe line downstream of said supply conduit for passing gas discharged from the second compressor therethrough to said pipe line, and control means for controlling the flow of gas to said first and second compressors.

5. Apparatus for a gas compressor station for increasing the pressure of gas flowing through a pipe line comprising a first gas compressor, a turbine connected to said first compressor for driving it, a supply conduit connected to said first compressor and pipe line for passing gas therethrough to the compressor, a discharge conduit connected to said first compressor and said pipe line downstream of said supply conduit for passing gas discharged from said first compressor therethrough back to said pipe line, a turbine inlet conduit connected to said discharge conduit and turbine for supplying gas thereto for driving the turbine, a heat exchanger disposed in said turbine inlet conduit, a heated fluid conduit in communication with said exchanger for passing heated fluid therethrough in heat exchange relationship with gas flowing therethrough to the turbine, a second compressor, a gas engine connected to said second compressor for driving it, an outlet conduit connected to the turbine and said second compressor for passing gas discharged from the turbine therethrough to the second compressor, a regenerator, said regenerator being in communication with said turbine inlet and outlet conduits for passing gas flowing to the turbine in heat exchange relationship therein with gas discharged from said turbine, a cooler disposed in said turbine outlet conduit between said regenerator and said second compressor, a cooling fluid conduit in communication with said cooler for passing cooling fluid therethrough in heat exchange relationship with gas flowing therethrough to said second compressor, another supply conduit connected to said supply conduit and said outlet conduit for passing gas therethrough to said second compressor, a compressor outlet conduit connected to said second compressor and said first compressor discharge conduit for passing gas discharged from the second compressor therethrough to said discharge conduit, and control means for controlling the flow of gas to said first and second compressors.

6. The apparatus of claim 5 wherein said other supply conduit is connected to said outlet conduit between said cooler and said second compressor inlet and said regenerator is in communication with the turbine inlet conduit between the inlet end thereof and said heat exchanger.

7. Apparatus for a gas compressor station for increasing the pressure of gas flowing through a pipe line comprising a first gas compressor, a turbine connected to said first compressor for driving it, a supply conduit connected to said first compressor and pipe line for passing gas therethrough to the compressor, a discharge conduit connected to said first compressor and said pipe line downstream of said supply conduit for passing gas discharged from said first compressor therethrough back to said pipe line, a turbine inlet conduit connected to said discharge conduit and turbine for supplying gas thereto for driving the turbine, a heat exchanger disposed in said turbine inlet conduit, a heated fluid conduit in communication with said exchanger for passing heated fluid therethrough in heat exchange relationship with gas flowing therethrough to the turbine, a second compressor, a gas engine connected to said second compressor for driving it, an outlet conduit connected to the turbine and said second compressor for passing gas discharged from the turbine therethrough to the second compressor, a regenerator, said regenerator being in communication with said turbine inlet and outlet conduits for passing gas flowing to the turbine in heat exchange relationship therein with gas discharged from said turbine, a cooler disposed in said turbine outlet conduit between said regenerator and said second compressor, a cooling fluid conduit in communication with said cooler for passing cooling fluid therethrough in heat exchange relationship with gas flowing therethrough to said second compressor, another compressor outlet conduit connected to said second compressor and said first compressor discharge conduit for passing gas discharged from the second compressor therethrough to said discharge conduit, and control means for controlling the flow of gas to said first and second compressors.

No references cited.